Dec. 13, 1932.  E. B. CARTER  1,890,968

HEEL MOLD

Filed Nov. 28, 1930

Inventor
Edward B. Carter
by James R. Hodder
Attorney

Patented Dec. 13, 1932

1,890,968

UNITED STATES PATENT OFFICE

EDWARD B. CARTER, OF LEXINGTON, MASSACHUSETTS

HEEL MOLD

Application filed November 28, 1930. Serial No. 498,600.

My present invention relates to molds, and more particularly to a novel and improved mold for use in the manufacture of rubber heels.

The invention of the present application is also applicable in the manufacture of any rubber articles wherein a slug or biscuit of uncured rubber is molded in a mold cavity.

Rubber heel molds, as utilized at present, comprise a base plate having a plurality of sets of pins, each set of pins being arranged in general heel contour. Nail retaining washers are positioned on these pins, whereupon a middle plate or cavity plate is positioned on the base plate with the aforesaid pins located in said cavities. Thereupon a slug or biscuit of uncured rubber is placed on each set of pins, and a third plate positioned above said biscuit. Thereupon the mold is subjected to pressure and heat, forcing the biscuit onto the pins and flowing the rubber around the pins and washers so that in the completed heel the washers will be embedded therein.

An important object of the present invention is the provision of a heel mold wherein means is provided to retain a slug or biscuit in the mold cavity when said mold cavity is in inverted position.

Another object of the invention resides in the provision of a mold wherein the slugs or biscuits of uncured rubber may be applied to their respective sets of washered pins simultaneously.

Another feature of my invention resides in the fact that the means to retain the individual biscuits in their cavities is removable, so that on breakage thereof said means may be readily removed and replaced.

Another feature of my invention resides in the provision of a mold wherein the top plate and cavity plate are united as one unit, instead of two individual units as heretofore. My novel mold, therefore, requires less handling and manipulation than present molds, is easier to fill with slugs or biscuits of uncured rubber, insures positive alinement of the slugs or biscuits with their respective sets of pins and washers, and greatly increases the speed of production of rubber heels or other analogous articles.

Other objects and features of the invention reside in the particular construction and arrangement of the parts of my novel mold, and all of the above and other objects and features, details of construction, combinations of parts, and advantages, will be hereinafter more fully pointed out, described and claimed.

Figure 1:
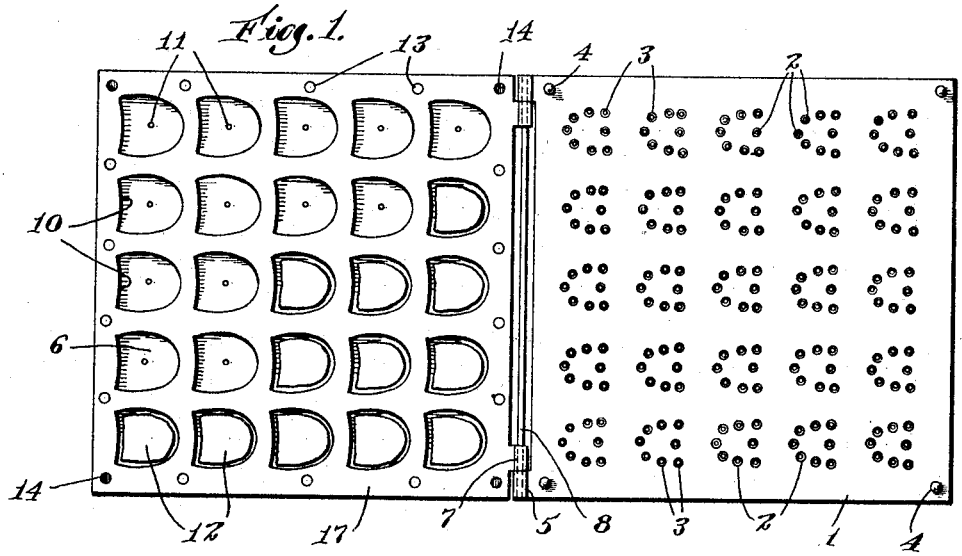
Figure 2:
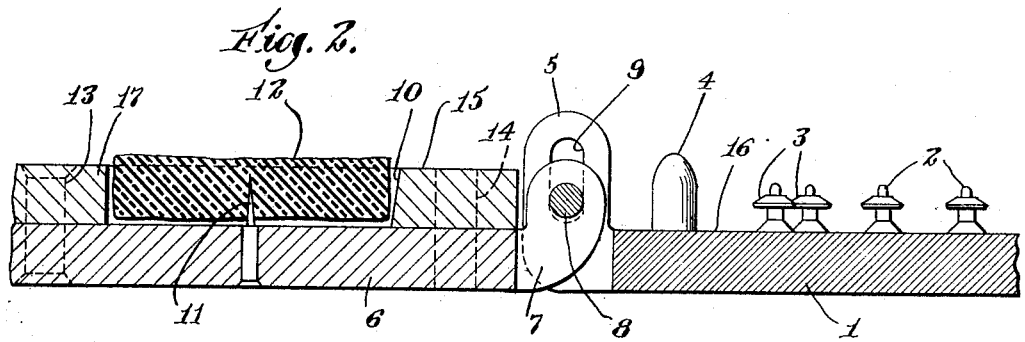
Figure 3:
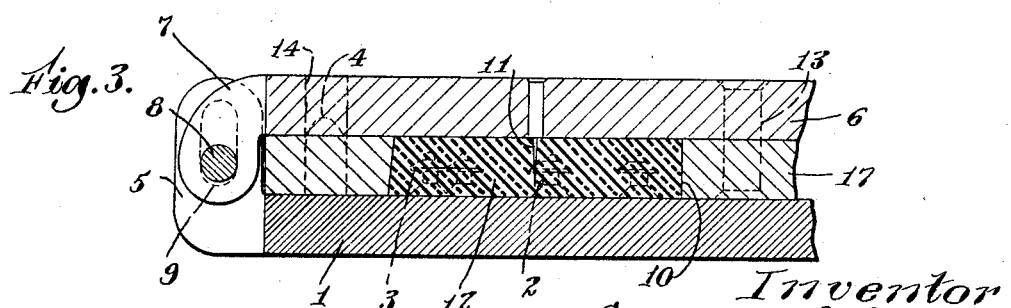

Referring to the drawing, illustrating a preferred embodiment of the present invention, Fig. 1 is a top plan view of my novel mold in open position;

Fig. 2 is an enlarged fragmentary cross sectional view of a portion of said mold; and Fig. 3 is an enlarged fragmentary cross sectional view illustrating the mold in closed position.

Referring now to the drawing, for a particular description of the invention, its construction and operation, my novel mold comprises a base 1 on which are fixed a plurality of pins 2, these pins 2, as clearly indicated in Fig. 1, being arranged in the outline or contour of heels. Washers 3 are positioned on the pins 2 in the usual manner, these washers, in a rubber heel, constituting nail retaining or engaging means.

Also fixed in the base plate 1 are dowel pins 4. Vertically projecting lugs 5 are formed at one end of the plate 1, and have therein elongated slots 9. A top plate 6 is provided with projecting lugs 7 carrying a rod 8. By means of this rod 8 the top plate 6 may be raised in the lugs 5 and hinged to a position over the base plate 1, and in parallelism therewith. Fixed to the top plate 6, as by rivets 13, is a middle plate or cavity plate 17 having formed therein the cavities 10 shaped to the finished shape and contour of an article to be molded therein, as, for example, a rubber heel. Apertures 14 are provided through the top plate 6 and cavity plate 17, adapted to accommodate the dowel pins 4 to properly register the plates 1 in molding position.

In the top plate 6, and projecting into each cavity 10 I provide a plurality of pins 11, and while I have illustrated only one of these pins projecting into each cavity, it will be understood that any desirable number of said pins in each cavity may be provided. These pins are readily removable and replaceable, so that in the event of breakage of a pin, it is only necessary to drive the remainder of said pin out through the top plate 6 and replace the same with a new pin.

When the mold is in open position, as illustrated in Fig. 1, an operator places a slug or biscuit 12 of uncured rubber into each mold cavity 10, pressing the slug 12 downwardly on to the pin 11 in each cavity. When the cavities 10 are filled with slugs or biscuits, the combined top plate and cavity plate, with the biscuits in the latter, is raised and swung on the rod 8 until the cavities 10 are in inverted position, and over the base plate 1. Each mold cavity 10 is alined with a cooperating set of pins 2 and washers 3, and the top plate and cavity plate are then lowered until the dowel pins 4 engage the apertures 14, whereupon each slug 12 will be seated on top of its cooperating set of pins 2. Thereupon pressure and heat is applied, lowering the plates 6 and 17 and forcing the biscuits 12 over the pins 2 and washers 3, the heat causing the rubber of the biscuit 12 to flow around and under the washers 3, and around the pins 2. The pressure is continued until the cooperating faces 15 and 16 of the middle plate 17 and bottom plate 1 respectively are in engagement, whereupon the mold formed by the bottom of the top plate 6, the top of the bottom plate 1, and the walls of the cavity 10 are of the size desired for the finished article.

Because of the fact that the biscuits 12 are impaled on the pins 11, said biscuits will be retained in the cavities 10 when the plate 17 is in inverted position, and all of the biscuits 12 will be positively alined with their cooperating sets of pins and washers when the said middle plate 17 and top plate 6 are dropped on to the base plate 1.

I believe that the mold herein described is novel, and have, therefore, claimed the same broadly, and it will be appreciated and understood by those skilled in the art that my novel mold is capable of a wide range of use, not only with rubber heels, but with articles of an analogous nature.

While I have necessarily described my present invention somewhat in detail, it will be appreciated that I may vary the size, shape and arrangement of parts, within reasonably wide limits, without departing from the spirit of the invention.

My invention is further described and defined in the form of claims as follows:

1. A two-part mold comprising a base plate having a group of washer-receiving pins thereon, a plate hinged to said base plate and having a cavity therein to receive an article to be molded, and means to retain said article in said cavity in any position of said cavity plate.

2. A two-part mold comprising a base plate having a group of washer-receiving pins thereon, a plate hinged to said base plate and having a cavity therein to receive an article to be molded, and means in said cavity to retain said article in said cavity in any position of said cavity plate.

3. A two-part mold comprising a base plate having a group of washer-receiving pins thereon, a plate hinged to said base plate and having a cavity therein to receive an article to be molded, and a pin in said cavity to penetrate said article and retain the same in said cavity in any position of said cavity plate.

4. A two-part mold comprising a base plate having a group of washer-receiving pins thereon, a plate hinged to said base plate and having a cavity therein to receive an article to be molded, and a removable pin in said cavity to penetrate said article and retain the same in said cavity in any position of said cavity plate.

5. A two-part mold comprising a base plate having a group of washer-receiving pins thereon, a plate hinged to said base plate and having a cavity therein to receive an article to be molded, and means in said cavity to penetrate said article and retain the same in said cavity in any position of said cavity plate.

6. A two-part mold comprising a base plate having a group of washer-receiving pins thereon, a plate hinged to said base plate and having a cavity therein to receive an article to be molded, and removable means in said cavity to penetrate said article and retain the same in said cavity in any position of said cavity plate.

7. A two-part heel mold comprising a base plate and having a plurality of groups of washer-receiving pins thereon, a plate hinged to said base plate and having a plurality of biscuit-receiving cavities therein, each cavity being alined with a cooperating group of pins when said plates are in closed position, and means to retain said biscuits in said cavities in any position of said cavity plate, whereby each biscuit will be properly centered upon its respective group of pins.

8. A two-part heel mold comprising a base plate and having a plurality of groups of washer-receiving pins thereon, a plate hinged to said base plate and having a plurality of biscuit-receiving cavities therein, each cavity being alined with a cooperating group of pins when said plates are in closed position, and biscuit-penetrating means to retain said biscuits in said cavities in any position of said cavity plate, whereby each biscuit will be properly centered upon its respective group of pins.

9. A two-part heel mold comprising a base plate and having a plurality of groups of washer-receiving pins thereon, a plate hinged to said base plate and having a plurality of biscuit-receiving cavities therein, each cavity being alined with a cooperating group of pins when said plates are in closed position, and biscuit-penetrating means in each cavity to retain said biscuits in said cavities in any position of said cavity plate, whereby each biscuit will be properly centered upon its respective group of pins.

In testimony whereof, I have signed my name to this specification.

EDWARD B. CARTER.